Figure 1:
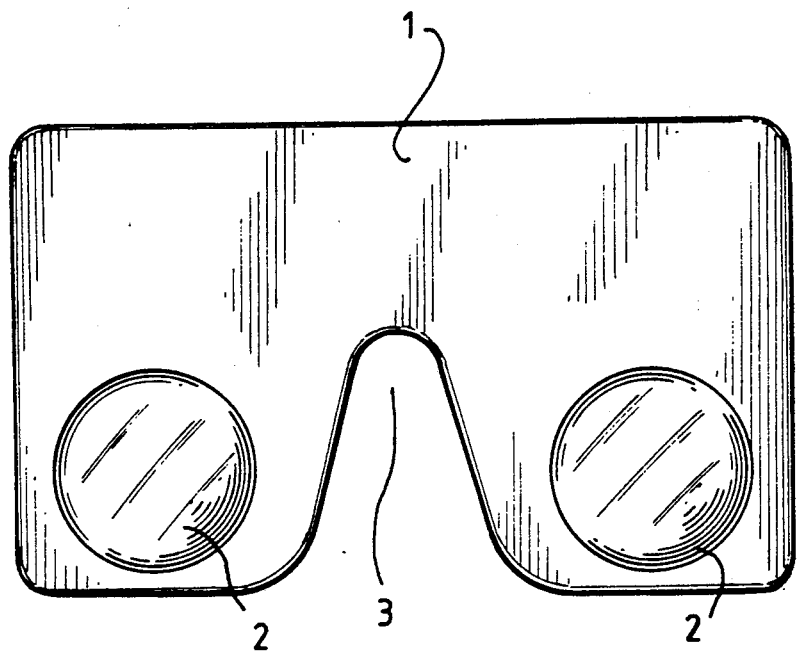

United States Patent [19]
Arad

[11] Patent Number: 5,110,197
[45] Date of Patent: * May 5, 1992

[54] EMERGENCY EYE GLASS

[76] Inventor: Chaim Arad, 32 Mikve Israel Street, Holon, Israel

[*] Notice: The portion of the term of this patent subsequent to Aug. 6, 2008 has been disclaimed.

[21] Appl. No.: 639,683

[22] Filed: Jan. 10, 1991

Related U.S. Application Data

[63] Continuation of Ser. No. 499,051, Mar. 26, 1990.

[30] Foreign Application Priority Data

Mar. 24, 1989 [IL] Israel .......................................... 89732

[51] Int. Cl.$^5$ ........................... G02C 1/00; G02C 7/08
[52] U.S. Cl. ........................................ 351/41; 351/65; 351/57
[58] Field of Search ............................. 351/41, 65-70, 351/47, 57

[56] References Cited

U.S. PATENT DOCUMENTS 2,273,434  2/1942  Burchell ................................. 351/65

FOREIGN PATENT DOCUMENTS 2576117  7/1986  France ................................... 351/41

Primary Examiner—Rodney B. Bovernick
Attorney, Agent, or Firm—Edwin D. Schindler

[57] ABSTRACT

An emergency eye glass is disclosed in which there is provided an eye glass which includes a flat, plate shaped body which includes two optical lenses. The optical lenses are integrally molded from plastics with the flat, plate shaped body.

2 Claims, 1 Drawing Sheet

EMERGENCY EYE GLASS

This application is a continuation of application Ser. No. 07/499,051, filed Mar. 26, 1990, now U.S. Pat. No. 5,037,192.

The present invention relates to eye glasses for use at an emergency. Those who have to wear glasses and who without those are practically blind or whose vision is impaired to a great part and can be corrected only by optical glasses often are rendered helpless in case that their eye glasses are broken or dropped, the wearer being unable—due to loss of eye sight without glasses—to retrieve her or his glasses.

The present invention strives to remedy the above by providing emergency glasses which a person can conveniently carry on her or his person without causing unsightly bulges of that person's wearing apparel.

According to the invention there is provided an eye glass which is constituted by a flat, plate shaped body in which are included two optical lenses being integrally molded from plastics with the said flat, plate shaped body Advantageously the plate shaped body is made of transparent material, as are the lenses.

In fabricating a device of this kind, inserts such as used in the manufacture of plastic lenses are placed in the mold in which the device is molded and the plate shaped body with the two lenses is molded integrally with one another.

True, eye glasses obtained by such a process might not ideally correct the vision of a person, but they serve during an emergency until the wearer of the glasses can retrieve the dropped glasses or has obtained a substitute for her or his broken ones.

The invention will now be described in detail with reference to the annexed drawings, showing in FIG. 1 a front view of the new emergency eye glasses, and in FIG. 2 an edgeways view thereof.

Figure 2:
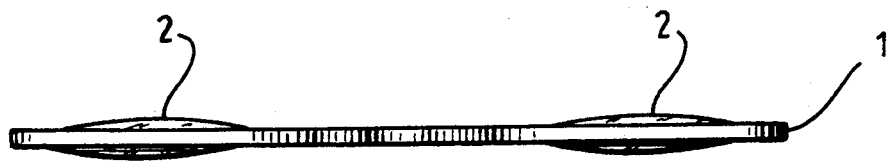

Turning first to FIG. 1, a flat plate 1 constitutes the body or "frame" of the new emergency eye glasses. It is suggested that the plate 1 should be of the dimension (which is standard) of the conventional credit card so that it could easily and conveniently be held in a conventional ban note folder or pocket book. In plate 1 are included and are integral therewith two lenses 2 which usually are somewhat convex at one of the surfaces of plate 1, without—however—materially adding to the total thickness of the device.

These lenses are molded integrally with the major extension of plate 1 and generally comprise the same material, i.e. the plate 1 itself is also transparent. A cut-out 3 is provided so that the plate 1 can conveniently be held in front of a person's face, her or his nose being positioned in cut-out 3.

The new device is not intended for permanent use but only to bridge the "glassless" period after loss or breakage of an eye glass wearer's glasses. It will be seen that the new device effectively solves the problem often met by eye glass wearers who are temporarily losing the use of their glasses.

I claim:

1. Eye glasses for temporary use during an emergency comprising:
   a flat, plate-shaped body having size dimensions which are substantially the same as a credit card, said plate-shaped body having a noes area cut-out, said nose area cut-out having no projections; and,
   two optical lenses having diopter power, said optical lenses being made from a plastic material and held within the plane of said flat, plate-shaped body.

2. The eye glasses according to claim 1, wherein said flat, plate-shaped body is, at least, partially transparent.

* * * * *